United States Patent
McKalip et al.

(10) Patent No.: US 9,245,255 B2
(45) Date of Patent: Jan. 26, 2016

(54) METHOD AND A SYSTEM FOR MONITORING AN ACTIVITY OR LACK OF ACTIVITY OF A SUBJECT

(76) Inventors: Douglas Charles McKalip, Worth, IL (US); Francis J. Muno, Wayne, IL (US)

( * ) Notice: Subject to any disclaimer, the term of this patent is extended or adjusted under 35 U.S.C. 154(b) by 21 days.

(21) Appl. No.: 13/462,724

(22) Filed: May 2, 2012

(65) Prior Publication Data
US 2012/0280811 A1 Nov. 8, 2012

Related U.S. Application Data

(60) Provisional application No. 61/481,505, filed on May 2, 2011.

(51) Int. Cl.
G08B 1/08 (2006.01)
G06Q 10/10 (2012.01)
G08B 21/04 (2006.01)
G08B 25/01 (2006.01)
G06Q 50/06 (2012.01)

(52) U.S. Cl.
CPC ............ *G06Q 10/10* (2013.01); *G08B 21/0423* (2013.01); *G06Q 50/06* (2013.01); *G08B 25/016* (2013.01)

(58) Field of Classification Search
CPC .................................................... A61B 5/0002
USPC ................... 340/506, 572.1, 573.1, 531, 632; 382/100; 600/301, 300; 700/65
See application file for complete search history.

(56) References Cited

U.S. PATENT DOCUMENTS

| | | | |
|---|---|---|---|
| 6,201,476 B1 * | 3/2001 | Depeursinge et al. | 340/573.1 |
| 6,611,206 B2 * | 8/2003 | Eschelman et al. | 340/573.1 |
| 6,812,840 B2 * | 11/2004 | Gehlot et al. | 340/572.1 |
| 6,930,598 B2 * | 8/2005 | Weiss | 340/531 |
| 7,151,968 B2 * | 12/2006 | Williamson | 700/65 |
| 7,154,398 B2 | 12/2006 | Chen | |
| 7,187,279 B2 | 3/2007 | Chung | |
| 7,265,676 B2 | 9/2007 | Gordon | |
| 7,659,826 B2 | 2/2010 | Humbard | |
| 7,685,005 B2 | 3/2010 | Riff | |
| 2004/0186739 A1 * | 9/2004 | Bolles et al. | 705/1 |
| 2005/0040944 A1 | 2/2005 | Contestabile | |
| 2005/0093705 A1 | 5/2005 | Humbard | |
| 2005/0237207 A1 * | 10/2005 | Gilbert et al. | 340/573.1 |
| 2006/0190542 A1 | 8/2006 | Rhoades | |
| 2007/0280462 A1 | 12/2007 | Neece | |
| 2007/0290830 A1 * | 12/2007 | Gurley | 340/506 |
| 2008/0117067 A1 * | 5/2008 | Abel et al. | 340/632 |
| 2010/0145164 A1 * | 6/2010 | Howell | 600/301 |
| 2011/0184247 A1 * | 7/2011 | Contant et al. | 600/300 |
| 2012/0106778 A1 * | 5/2012 | Cuddihy et al. | 382/100 |

* cited by examiner

*Primary Examiner* — Benjamin C Lee
*Assistant Examiner* — Israel Daramola
(74) *Attorney, Agent, or Firm* — Ariel S. Bentolila; Bay Area IP Group LLC

(57) ABSTRACT

A method and a system comprise monitoring one or more devices associated with a subject to generate one or more activity alerts for the subject. The activity alerts at least indicating the subject is active within their environment. The activity alerts are transmitted to a system unit for processing, in which the system applies a set of rules in determining a triggering event and notifies an interested party of activity of the subject and of inactivity of the subject.

16 Claims, 5 Drawing Sheets

METHOD AND A SYSTEM FOR MONITORING AN ACTIVITY OR LACK OF ACTIVITY OF A SUBJECT

CROSS-REFERENCE TO RELATED APPLICATIONS

The present Utility patent application claims priority benefit of the U.S. provisional application for patent Ser. No. 61/481505 entitled "Method of Communicating the Presense or Lack of Activity of Subject Person to Interested Party(ies)", filed on 2 May 2011, under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to monitoring activity of a subject. More particularly, the invention relates to using a mobile communication device to monitor activity of the subject.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that single, home bound, sick or elderly people living by themselves creates a conflict between a loved one calling all the time and not wanting to be a pest. When several persons are 'checking in', the randomness of the phone calls sometimes leaves large gaps in time. Knowing this, the interested party(ies) may have a level of anxiety by not knowing the status of the subject person at any given time. The single, home bound, sick or elderly person living by themselves also achieves peace of mind knowing if they are not active, help will be coming. There are existing services that call subject person with information or looking for responses. These services require calls from the service to confirm status.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1a illustrates exemplary activity alerts generation by subject. FIG. 1b illustrates exemplary trigger rule logic. FIG. 1c illustrates exemplary action rules on trigger;

Figure 1A:
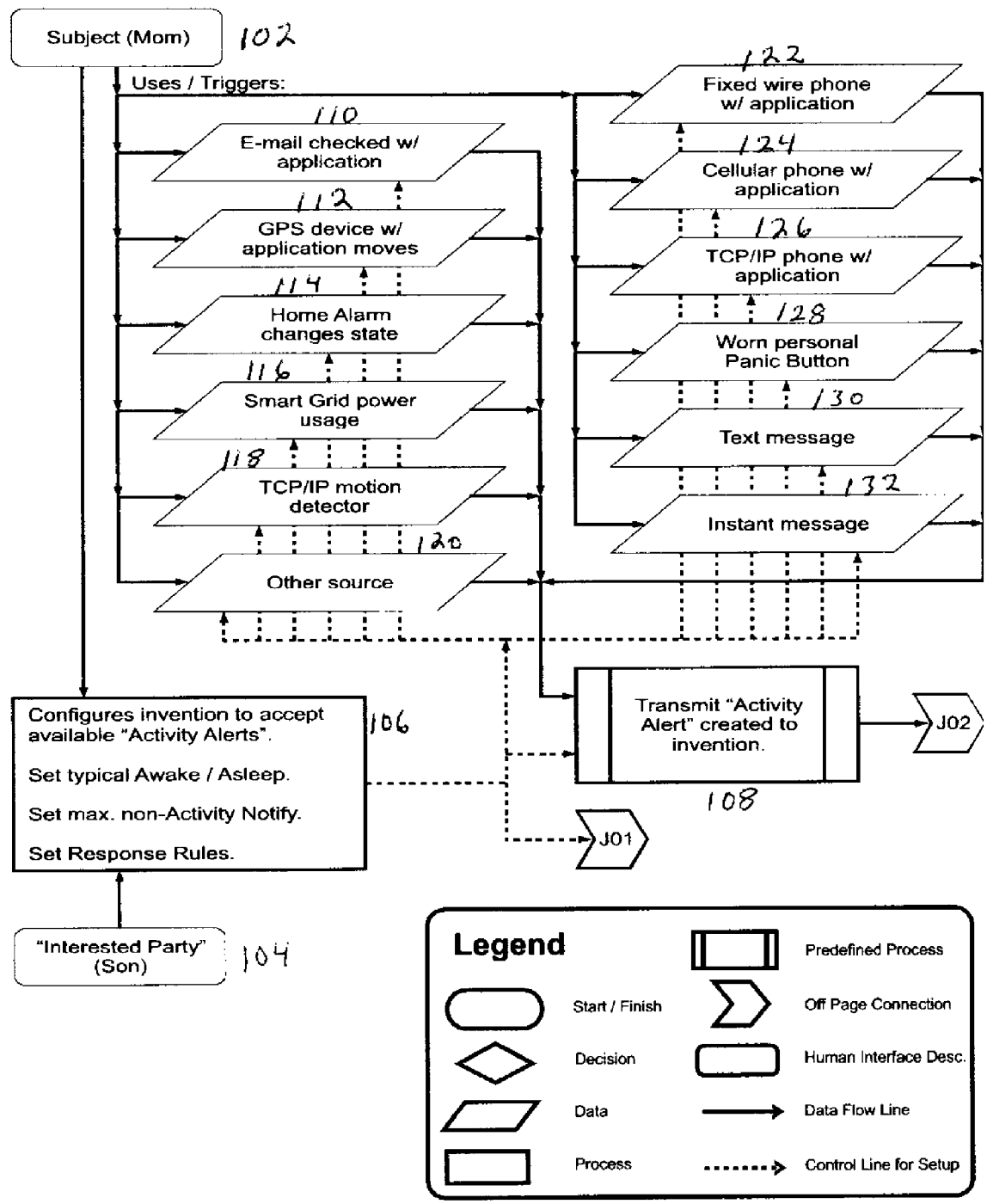
FIGS. 1a, 1b, and 1c illustrate exemplary logic flow, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Some embodiment of the present invention relate to methods and systems of communicating the presence or lack of activity of subject person by phone, email, text, instant messenger, web site or other means to interested party(ies).

Figure 1B:
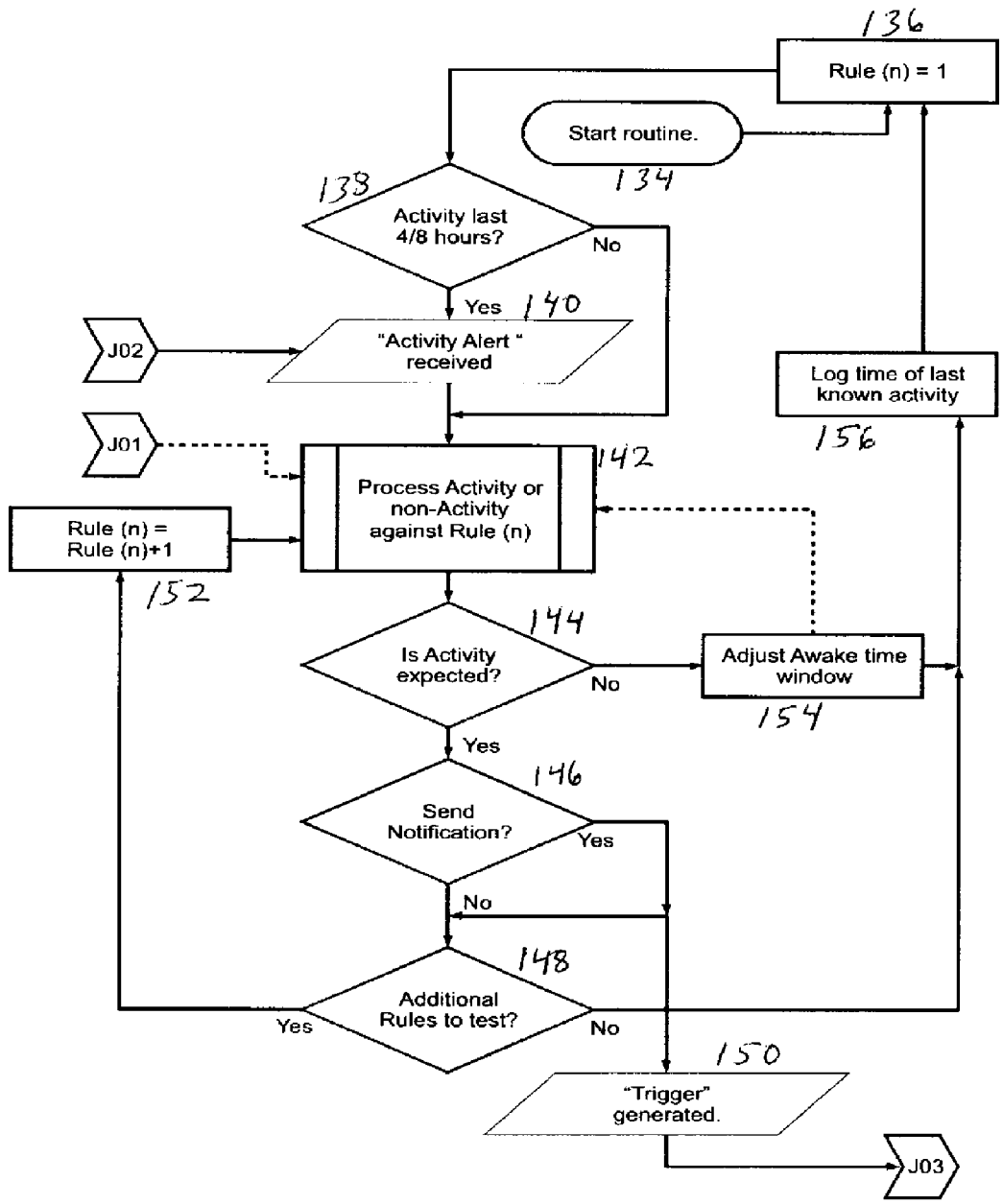
Figure 1C:
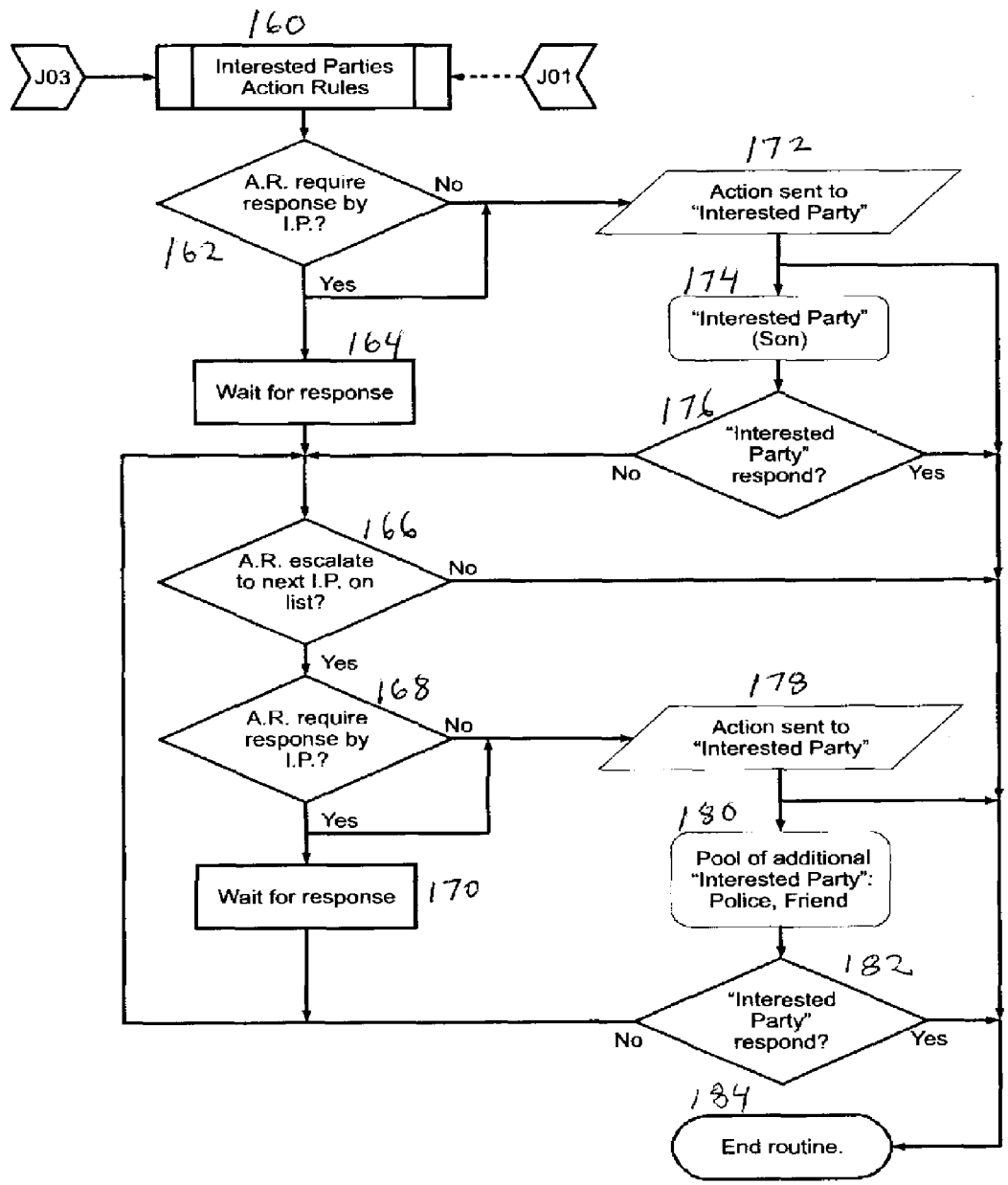

Referring to FIGS. 1a, 1b and 1c, some embodiment may comprise:

"Activity Alert"s are method of monitoring, including but not exclusive to: outbound phone calls, completed inbound phone calls, sent emails, sent text messages, instant messaging, GPS tracking devices including stand alone, built into cell phones and built into other devices.

The generated "Activity Alert" may be communicated to the system from, but limited to, conventional wired phones, VOIP phones, cellular phones, cellular service in other devices, WIFI service, private networks, the World Wide Web, direct Web Site contact with invention, etc.

These devices and others may communicate directly to the system via aforementioned means or through a intermediary such as, but not limited to, a telecommunication company, internet provider, conventional telephone company, cell phone company, cable internet service that monitors phone, email; text, email, internet, cell phone and cell phone GPS activity or other GPS device.

Additional "Activity Alert"s generated may comprise, but not be exclusive to, TCP/IP based motion detectors, wireless panic buttons or "OK status" buttons and other sensors or devices that separately or in combination that may communicate with the system.

Rules may set up for use of the system and are of two types: "Trigger Rules" and "Action Rules".

General "Trigger Rules" may include, but not limited to, awake and sleep times.

"Trigger Rules" on awake and sleep times may be set up to dynamically shift based on "Activity Alerts" monitored.

"Trigger Rules" may include what "Activity Alerts" are to be monitored.

"Trigger Rules" may include when "Activity Alerts" are expected or not expected.

Individual "Trigger Rules" may be set up for each type of "Activity Alert".

"Trigger Rules" may include more complex combinations of "Activity Alerts" or absence of "Activity Alerts".

"Action Rules" may be a selection of actions for the system to perform upon a "Activity Alert" event based on "Trigger Rules".

"Action Rules" may comprise methods of reporting to interested party(ies), subject or third party; via email, text message, instant messaging, conventional wired phones, VOIP phones, cellular phones, cellular service in other devices, WIFI service, private networks, the World Wide Web, and direct Web Site contact with invention, etc.

"Action Rules" may comprise reporting to subject person via above means and expecting response upon exception of "Trigger Rules".

"Action Rules" may comprise reporting to interested party(ies) via above means and expected responses upon exception of previous rules.

"Action Rules" may comprise reporting to third party via above means and expected responses upon exception of previous rules.

"Action Rules" may comprise reporting to additional parties.

Both the absence of, or one or more "Activity Alerts" may activate a "Trigger Rule" and one or more "Actions" may be required. In a non-limiting example, the system may be as simple as sending a text to the interested party(ies) every time the subject person uses the phone. "Activity Alerts" may be extended beyond the aforementioned to any event that can communicate with the web based system, including but not limited to: a burglar alarm reporting changes of status, specialized IP based activity monitors, any event that can be reported from a home automation system like motion sensors, door openings and closings. Even real time water meter usage, Smart Grid power usage, or any other event that can be reported from a home can be utilized.

"Activity" types, trigger types and actions may be predetermined on the web site and set up by the user. On "Activity Alert" and exception to the rules, "Actions" may be predefined on the web site and executed.

Referring to FIGS. 1a, 1b and 1c, in some embodiments, an exemplary method may comprise:

The Subject Person, as for example may be Mom.

The Interested Party, as for example may be the son.

A Third Party may be a friend or the police.

Additional notifications (Forth Party, etc.) may be defined.

Access to the system via the internet may be made by the Subject Person, Interested Party(ies) or authorized third parties.

"Activity Alerts", "Trigger Rules" and "Actions" may set up on the web site by, for example, the Subject Person (Mom), Interested Party(ies) (Son, Family) or authorized third parties from predetermined choices.

Awake times rules may be set, for example, between 8:00 AM and 9:00 PM.

"Activity Alerts" may be phone activity, sent email, sent text messages, GPS locations and motion in Mom's home.

"Action Rule" may be, for example: If no "Activity Alerts" within 4 hours during awake time, contact Mom via preset rules and expect response.

If previous rules are met, no further "Action" may be called for in additional "Action Rules".

Alternatively an "Action Rule" may be set up, for example, to send a low priority message or other message to the son.

If exception to above, contact son via preset methods and expect response. Phone response for example could keyed or voice recognition acknowledgment of receipt of message.

If no response by son to contact from the system, the next "Action Rule" may specify an escalation of the alert to other devices, for example, Third Parties and beyond.

A more proactive set of "Action Rules" may consist of monitoring "Activity Alerts" in real time by son. One "Action Rule" may be to alert the son via text message or other means on "Activity Alert". In a non-limiting example, text message may be sent to son that Mom made phone call @ 10:23 AM.

If exception to above, contact predefined third party with alert and expect response.

If exception to above, further escalation of event may be possible.

Some embodiments may comprise an Internet based program communicating with "Activity Alerts" and performing "Actions".

In some embodiments, the system may be used by medical caretakers or appointed guardians for an automated care system.

In some embodiments the system may further be used to track activity within one's own home as a inexpensive monitored burglar alarm.

In some embodiments, the system may further be used for hikers, mountain climbers, boaters, etc. to post an itinerary and report to interested parties if no cell phone activity after predefined time limits so interested parties could notify authorities of missing person.

In some embodiments, the system may be totally passive in that if subject person is making and taking phone calls, moving around the residence and operating with the user defined rules, no action is taken. It can be totally automated and set up by the subject or interested party(ies). Some differences with any existing system is that some embodiments of the system monitor activity of communication devices and motion detectors and require no inbound or outbound calls to or from a 'service'.

In some embodiments, the system may utilize "Activity Alert" devices running software to modify them or devices specially designed to communicate with the system.

Some embodiments may comprise licensing communication companies that would monitor the aforementioned "Activity" on standard communication devices and generate "Activity Alerts" to the system.

Some embodiments may comprise incorporation by one or more communication companies that provides "Activity Alerts" from existing communication devices as well as other devices, using the company's network and computers to track "Activity" and report to the system.

FIGS. 1a, 1b, and 1c illustrate exemplary logic flow, in accordance with an embodiment of the present invention. FIG. 1a illustrates exemplary activity alerts generation by subject. FIG. 1b illustrates exemplary trigger rule logic. FIG. 1c illustrates exemplary action rules on trigger.

Referring to FIG. 1a, subject 102 and interested party 104 configures parameters of the system in step 106. Parameters may include, without limitation, available activity alerts, typical awake/asleep times, maximum amount of non-activity, and response rules. Activity alerts may be generated by numerous uses or triggers. E-mail checked 110 may be generated by use of e-mail by subject 102. GPS movement 112 may be generated by movement of GPS enabled mobile communication device. Home alarm 114 may be generated by a change in the state of the alarm system. Smart grid power 116 may be generated by a reported change in power usage. TCP/IP motion detector 118 may generate an activity alert. Usage of a fixed wire phone 122 may generate an activity alert. Usage of a cellular phone 124 may generate an activity alert. Usage of a TCP/IP 126 phone may generate an activity alert. Activation of a personal panic button may generate an activity alert. Sending a text message 130 may generated an activity alert. Sending an instant message 132 may generate an activity alert. Generated activity alerts are transmitted to the system in step 108.

Referring to FIG. 1b, received activity alerts from step 108 are processed by rules to determine if a trigger may be generated.

Referring to FIG. 1c, triggers from step 150 are processed to notify interested party 104.

Figure 2:
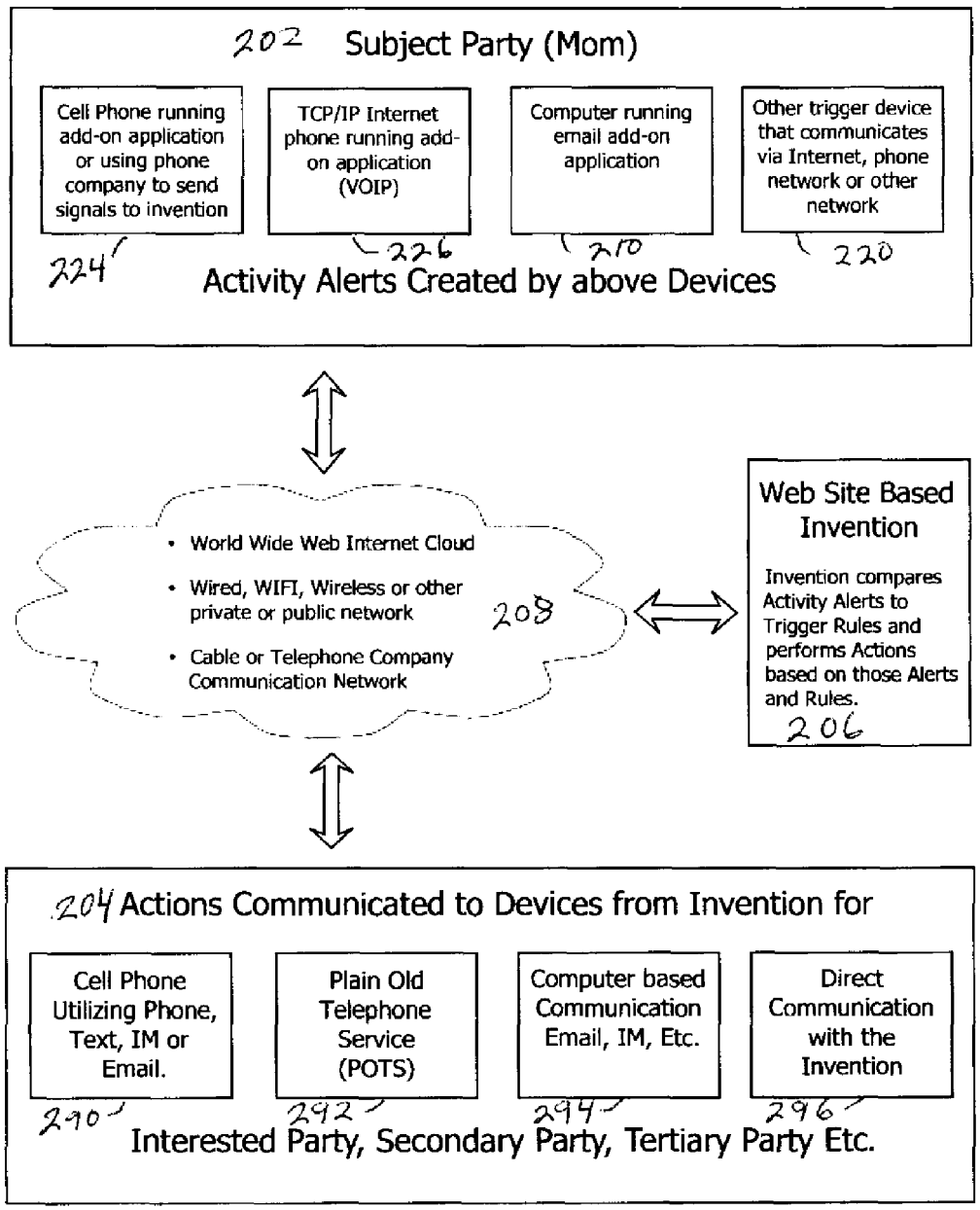
FIG. 2 illustrates exemplary communication of activity alerts, in accordance with an embodiment of the present invention.

FIG. 2 illustrates exemplary communication of activity alerts, in accordance with an embodiment of the present invention. Activity alerts generated by devices associated with subject 202 may be communicated to the system 206 via various communication channels 208. Notifications to interested party 204 may communicated via communication channels 208 to various means associated with interested party 204.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 3:
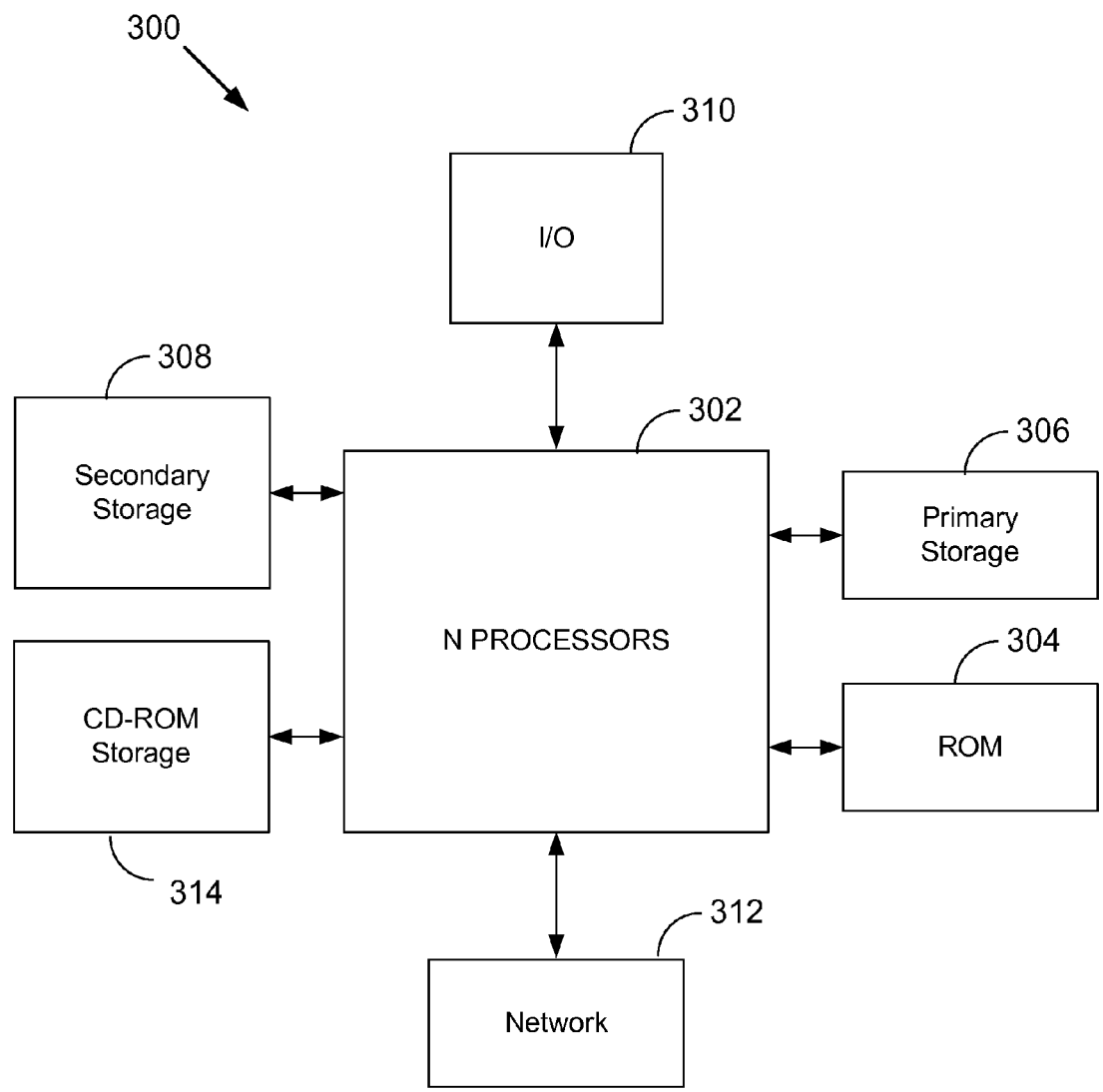
FIG. 3 illustrates a typical computer system that, when appropriately configured or designed, can serve as a computer system in which the invention may be embodied.

FIG. 3 illustrates a typical computer system that, when appropriately configured or designed, can serve as a computer system in which the invention may be embodied. The computer system 300 includes any number of processors 302 (also referred to as central processing units, or CPUs) that are coupled to storage devices including primary storage 306 (typically a random access memory, or RAM), primary storage 304 (typically a read only memory, or ROM). CPU 302 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 304 acts to transfer data and instructions uni-directionally to the CPU and primary storage 306 is used typically to transfer data and instructions in a bi-directional manner. Both of these primary storage devices may include any suitable non-transitory computer-readable media such as those described above. A mass storage device 308 may also be coupled bi-directionally to CPU 302 and provides additional data storage capacity and may include any of the computer-readable media described above. Mass storage device 308 may be used to store programs, data and the like and is typically a secondary storage medium such as a hard disk. It will be appreciated that the information retained within the mass storage device 308, may, in appropriate cases, be incorporated in standard fashion as part of primary storage 306 as virtual memory. A specific mass storage device such as a CD-ROM 314 may also pass data uni-directionally to the CPU.

CPU 302 may also be coupled to an interface 310 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 302 optionally may be coupled to an external device such as a database or a computer or telecommunications or internet network using an external connection as shown generally at 312, which may be implemented as a hardwired or wireless communications link using suitable conventional technologies. With such a connection, it is contemplated that the CPU might receive information from the network, or might output information to the network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: the receiving of activity alerts, processing the activity alerts, generating triggers, and notifying the interested party.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of monitoring a subject for activity and notifying an interested party according to the present invention will be apparent to those skilled in the art. The invention has been described above by way of illustration, and the specific embodiments disclosed are not intended to limit the invention to the particular forms disclosed. For example, the particular implementation of the rules and triggers may vary depending upon the particular type devices used. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method comprising the steps of:
   setting up conditions for at least one web-based activity alert, on a website, based on at least one predetermined activity event of a subject by at least one of an interested party and authorized third parties, wherein said conditions for at least one activity alert comprises a detection of said at least one predetermined activity event of the subject, and a detection of a lack of said at least one predetermined activity event of said subject;
   preconfiguring, on said website, at least a predetermined amount of awake time window and sleep time window of said subject;
   setting up at least a web-based trigger rule, on said website, in which said trigger rule comprises at least one predetermined trigger setting, wherein said at least one predetermined trigger setting includes an actuation of said activity alert during the respective said preconfigured amount of awake and sleep time windows of said subject, in which said awake time window corresponds to a preconfigured range of time of expected activity, and wherein said sleep time window corresponds to a preconfigured range of time of of expected inactivity;
   setting up at least a web-based action rule, on said web site, wherein said action rule comprises a selection of actions for a system unit to perform based upon said conditions for at least one activity alert event and said trigger rule;
   monitoring one or more device that communicates with said web site and associated with said subject to generate at least one activity event for determining one or more of said activity alert for said subject, in which said device comprises a mobile communication device for detecting use of email, phone texting or messaging by said subject;
   transmitting said at least one activity alert to said system unit for processing, in which said system unit applies said trigger rule to said at least one activity alert and applies said action rule upon activation of said trigger rule, and responsively notifying at least one of said interested party and authorized third parties of at least one of said detection of at least one predetermined activity event of said subject and said detection of lack of at least one predetermined activity event of said subject; and
   adjusting said predetermined amount of awake time window upon detection of a non-predetermined activity event in which the detected activity event within said awake time window is not expected.

2. The method as recited in claim 1, in which said predetermined activity event comprises at least one of a use of email by said subject, phone texting or messaging by said subject, activation of a motion detector by said subject, movement to various locations by said subject, and said lack of predetermined activity event by said subject.

3. The method as recited in claim 2, in which said devices comprise at least one of a GPS locator for detecting said movement to various locations by said subject during said preconfigured amount of awake time window, and TCPIP motion detector for detecting said movement by said subject during said preconfigured amount of awake time window.

4. The method as recited in claim 3, in which said devices further comprise of applications in communication with said system unit for detecting said activity event and thereby indicate substantial activity of said subject.

5. The method as recited in claim 1, in which said subject and said interested party at least configure parameters on said web site for said at least one activity alerts, wherein said at least one activity alerts include IP based activity monitors that communicate with said web site, wherein said method further comprises a step of determining an action rule requiring an IP based response.

6. The method as recited in claim 1, in which said subject and said interested party at least configure parameters on said web site for said at least one trigger rules, wherein an absence of at least two or more activity alerts within a preconfigured amount of awake time window activates said at least one trigger rules.

7. The method as recited in claim 1, in which said system unit notifies a third interested party of at least one of said predetermined activity event based on said at least one trigger rules.

8. A method comprising:
   steps for setting up conditions for web-based activity alerts based on at least one predetermined activity event of a subject on a web site by at least one of an interested party, and authorized third parties, in which said at least one predetermined activity event comprises at least one of use of email by said subject, phone texting or messaging by said subject, activation of a motion detector by said subject, movement to various locations by said subject, and substantially lack of activity event of said subject, wherein activation of said activity alerts comprises a detection of at least one predetermined activity event of said subject;
   step for preconfiguring, on said website, at least a predetermined amount of awake time window and sleep time window of said subject;
   steps for setting up web-based trigger rules based on predetermined trigger settings and said activity alerts on said web site by at least one of said subject, interested party, and authorized third parties, wherein said sleep time window being configured to correspond substantially within a preconfigured amount of nighttime and said awake time window being configured to correspond substantially within a preconfigured amount of daytime, and wherein said substantially lack of said at least one predetermined activity event of said subject within said preconfigured amount of time within said awake time window activates said trigger rules;
   steps for setting up web based action rules based on predetermined actions and said trigger rules on said web site by said subject, interested party, or authorized third parties wherein said action rules are a selection of actions for a system unit to perform upon conditions for at least one activity alert event based on said trigger rules, in which said action rules comprise at least contacting said interested party or authorized third parties when substantially no activity event by said subject is detected within said preconfigured amount of time within said awake time window as indicated by said trigger rules, in which said action rules further comprises sending a low priority notification to said interested party or authorized third parties based on said action rules if said trigger rules indicate substantial activity of said subject based on detection of said at least one predetermined activity event within said sleep time window;
   steps for monitoring at least one device that communicates with said web site and associated with said subject to generate said at least one predetermined activity event for determining one or more of said activity alerts for said subject, in which said device comprises a mobile communication device for detecting use of email, phone texting or messaging by said subject as one or more of said at least one predetermined activity event;

steps for transmitting at least one of said activity alerts to said system unit for processing, in which said system unit applies said trigger rules to said at least one activity alert in and applies said action rules, and responsively notifying said interested party or authorized third parties of at least one of said at least one predetermined activity event of said subject and of substantially no activity event of said subject based on said trigger rules; and step for adjusting said predetermined amount of awake time window upon detection of a non-predetermined activity event in which the detected activity event within said awake time window is not expected.

9. A system comprising of:

means for setting up conditions for web-based activity alerts based on at least one predetermined activity event of a subject on a web site by at least one of an interested party, and authorized third parties, in which said conditions for said activity alerts comprises a detection of at least one of said at least one predetermined activity event of said subject, in which said at least one predetermined activity event comprises at least one of a use of email by said subject, phone texting or messaging by said subject, activation of a motion detector by said subject, movement to various locations by said subject , and substantially no activity event of said subject, wherein activation of said activity alert comprises a detection of at least one of said at least one predetermined activity event;

means for setting up web-based trigger rules based on predetermined trigger settings and said activity alerts on said web site by said interested party, or authorized third parties, in which said trigger setting includes said activity alerts at a preconfigured amount of awake time window and sleep time window of said subject, wherein a detection of said substantially no activity event of said subject within said preconfigured amount of time within said awake time window activates said trigger rules;

means for setting up web based action rules based on predetermined actions and said trigger rules on said web site by said interested party, or authorized third parties wherein said action rules are a selection of actions for a system unit to perform upon conditions for at least one activity alert event based on said trigger rules, in which said action rules comprise at least contacting said interested party or authorized third parties when said trigger rules indicate said detection of substantially no activity event of said subject within said preconfigured amount of time between within said awake time window;

means for monitoring one or more devices that communicates with said web site and associated with said subject to generate at least one activity event for determining one or more activity alerts for said subject;

means for transmitting at least one said activity alert to said system unit for processing, in which said system unit applies said trigger rules to said at least one activity alert and applies said action rules upon activation of said trigger rules and notifies said interested party or authorized third parties of at least one of said predetermined activity event of said subject and said lack of predetermined activity of said subject based on said trigger rules; and means for adjusting said preconfigured amount of awake time window upon detection of a non-predetermined activity event in which the detected activity event within said awake time window is not expected.

10. A system comprising:

A web site for setting up conditions for at least one web-based activity alert, trigger rules and action rules by at least one of interested party and authorized third parties, in which said conditions for said at least one activity alert comprises a detection of at least one predetermined activity event by a subject and a detection of a substantially lack of activity event of said subject;

wherein said at least one activity alert is based on said at least one predetermined activity event and substantially lack of activity event, and wherein trigger rules are based on predetermined trigger settings and at least one of preconfigured awake and sleep time windows of said subject, in which said awake time window comprises a preconfigured range of time, with said at least one activity alert being configured to correspond within said awake time window, and wherein said substantially lack of activity event of said subject within said preconfigured amount of time within said awake time window activates said trigger rules;

a devices being configured to communicate with said web site and associated with said subject to generate said at least one predetermined activity event for determining one or more of said at least one activity alert for said subject; wherein said at least one activity alert at least indicating said subject being active or inactive within their environment during at least one of preconfigured amount of awake time and sleep time windows of said subject, in which said device comprises a mobile communication device for detecting use of email, phone texting or messaging by said subject as one or more of said at least one predetermined activity event;

a system unit for processing said at least one activity alert by at least applying a set of said trigger rules to determine an action rule for notifying said interested party of activity of said subject and of inactivity of said subject during said preconfigured amount of time within said awake and sleep time windows of said subject; and a system unit for adjusting said preconfigured amount of awake time window upon detection of a non-predetermined activity event in which the detected activity event within said awake time window is not expected.

11. The system as recited in claim 10, in which said predetermined activity event comprises at least one of a use of email by said subject, phone texting or messaging by said subject, activation of a motion detector by said subject, movement to various locations by said subject, and said lack of substantial activity of said subject.

12. The method as recited in claim 10, in which said devices comprise at least one of a GPS locator for detecting said movement to various locations by said subject during said preconfigured amount of awake time window, and TCPIP motion detector for detecting said movement by said subject during said preconfigured amount of awake time window.

13. The system as recited in claim 10, in which said devices comprises at least an application in communication with the system unit.

14. The method as recited in claim 10, in which said subject and said interested party at least configure parameters on said web site for said at least one activity alert, wherein said at least one activity alert include IP based activity monitors that communicate with said web site, wherein said method further comprises a step of determining an action rule requiring an IP based response.

15. The method as recited in claim 10, in which said subject and said interested party at least configure parameters on said web site for said trigger rules, wherein an absence of at least two or more activity alerts within a preconfigured amount of awake time window activates said trigger rules.

16. The method as recited in claim 1, in which said system unit notifies a third interested party of at least one of said at least one predetermined activity event based on said trigger rules.

* * * * *